United States Patent [19]
Obinata et al.

[11] Patent Number: 5,613,239
[45] Date of Patent: Mar. 18, 1997

[54] METHOD AND APPARATUS FOR DECOMPOSING ORGANIC SOLUTIONS COMPOSED OF CHELATING SOLUTIONS AND/OR ORGANIC ACIDS CONTAINING RADIOACTIVE METAL IONS AND COLLECTION METHOD AND APPARATUS USING THE SAME

[75] Inventors: Hiroshi Obinata, Nagano; Seigo Ichikawa; Akihisa Kikuya, both of Kohshoku, all of Japan

[73] Assignees: Morikawa Industries Corp., Nagano-ken; Genden Engineering Services & Construction Co., Tokyo, both of Japan

[21] Appl. No.: 575,045

[22] Filed: Dec. 19, 1995

[30] Foreign Application Priority Data

Oct. 2, 1995 [JP] Japan .................................. 7-255391

[51] Int. Cl.$^6$ .................................................. G21F 9/00
[52] U.S. Cl. ........................ 588/1; 588/233; 588/205; 204/660; 204/665; 205/688
[58] Field of Search ........................ 588/1, 233, 205; 423/200; 204/660, 665; 205/688

[56] References Cited

U.S. PATENT DOCUMENTS

| | | | |
|---|---|---|---|
| 3,890,244 | 6/1975 | Carlin | 252/301.1 R |
| 3,932,225 | 1/1976 | Bilal et al. | 204/1.5 |
| 4,056,482 | 11/1977 | Schmieder et al. | 252/301.1 W |
| 5,230,782 | 7/1993 | Downes, Jr. et al. | 204/149 |
| 5,536,389 | 7/1996 | LaNaour et al. | 205/688 |

*Primary Examiner*—Ngoclan Mai
*Attorney, Agent, or Firm*—Armstrong, Westerman, Hattori, McLeland & Naughton

[57] ABSTRACT

A solution composed of a chelating solution and/or an organic acid is applied to radioactive metals to form a radioactive metal solution. The metal solution is increased in its electrical conductivity by addition of an alkaline agent, followed by electrolysis by an electrolyzer to thereby convert metal ions in the metal solution to hydroxides of low solubility and to separate the hydroxides as a filter cake by subsequent filtration. The filtrate is irradiated with ultraviolet rays for further decomposition of remaining organic matter and then filtered by a device using reverse osmosis. The resultant filtrate is recycled as clean water for use for a chelating solution and electrolytic solution, or is discharged. The metal ions precipitated by treatment with the alkaline agent prior to electrolysis as matter of low solubility is separated from the filtrate which is thereafter electrolyzed.

12 Claims, 1 Drawing Sheet

5,613,239

METHOD AND APPARATUS FOR DECOMPOSING ORGANIC SOLUTIONS COMPOSED OF CHELATING SOLUTIONS AND/OR ORGANIC ACIDS CONTAINING RADIOACTIVE METAL IONS AND COLLECTION METHOD AND APPARATUS USING THE SAME

BACKGROUND OF THE INVENTION

1. Field of the Invention

This invention relates to a method and apparatus for decomposing an organic solution composed of a chelating solution and/or an organic acid containing radioactive metal ions, and further to a method and apparatus for collecting radioactive metals using the same, which are used for removing, or decontaminating, the radioactivity of radioactive metals coming out of atomic power plants and the like.

2. Description of the Related Art

In decomposing waste solutions disposed out of atomic power plants and the like, there have hitherto been raised problems of collecting radioactive metals by way of dissolution. For instance, machinery and equipment installed at an atomic power plant are exposed to and laden with radioactivity and hence are required to be decontaminated by removal of their surface layers. and this poses a problem of collecting the resultant radioactive metals by way of dissolution.

The above problem can generally be coped with by removing the surface layers of the machinery and equipment by sand blasting or the like and by dissolving the resultant metals in an acid or the like to collect them. Here, the term "collect" can be taken as meaning "remove", and in the present invention is used including such meaning. The dissolution and collection steps can be conducted with an inorganic acid, an organic acid or a chelating solution. However, since an inorganic acid is rather dangerous to handle, a chelating solution or an organic acid is, or both are, usually used.

However, a chelating solution or an organic acid to be used for dissolution and collection of radioactive metals has a problem of its post-treatment in view of its mass volume needed for such treatment.

Because metals to be treated are laden with radiactivity, a chelating solution and/or an organic acid having such metals dissolved therein must be stored in safety and will reach a vast amount in quantity. This invites a social problem as to selection of locations at which to store such solution and acid, expansion of the existing locations, etc. A chelating solution or an organic acid containing radioactive metal ions needs to be cemented at the final stage, but all or most of such solution contains carboxyl group (COOH—) which would adversely affect the structural strength of mortar, rendering cement fixation unfeasible. In order to solve this problem, it is necessary to decompose a chelating solution and/or an organic acid in which radioactive metals have been contained, but any suitable method which would allow the decomposition step to be conducted in an efficient manner has not been found. Moreover, because of low ionizing degree, such chelating solution and/or organic acid is difficult to be electrolyzed or made by any similar treatment, leaving such kind of treatment beyond consideration.

SUMMARY OF THE INVENTION

With the foregoing problems of the prior art in view, the present invention provides a method and apparatus for decomposing an organic solution composed of a chelating solution and/or an organic acid containing radioactive metal ions, which make it available to quite remarkably decrease the mass volume of radioactive metals which are required to be stored after collection thereof by way of dissolution, and a method and apparatus for collecting radioactive metals using the same.

The invention also provides a method and apparatus for collecting radioactive metals in efficient and effective manner using the same.

More specifically, the invention provides a method for decomposing an organic solution containing radioactive metal ions, which comprises: forming a solution containing radioactive metal ions by applying a chelating solution and/or an organic acid to radioactive metals laden with radioactivity; adding an alkaline agent to the resultant solution to elevate electrical conductivity thereof; and electrolyzing the solution elevated in electrical conductivity with an electrolytic device.

There is also provided a method for collecting radioactive metals by way of dissolution, which comprises: forming a solution containing radioactive metal ions by applying a solution composed of a chelating solution and/or an organic acid to radioactive metals laden with radioactivity; adding an alkaline agent to the resultant solution to elevate electrical conductivity thereof; electrolyzing the solution elevated in electrical conductivity to generate therein metal hydroxides which are little soluble in water; and filtering the electrolyzed solution to separate metal hydroxides from the filtrate.

There is also provided a method for collecting radioactive metals by way of dissolution, which comprises: forming a solution containing radioactive metal ions by applying a solution composed of a chelating solution and/or an organic acid to radioactive metals laden with radioactivity; adding an alkaline agent to the resultant solution to elevate electrical conductivity thereof and to generate therein metal hydroxides which are little soluble in water; filtering the solution to separate the metal hydroxides as a filter cake from the filtrate; electrolyzing the filtrate to further generate therein metal hydroxides which are little soluble in water; and filtering the filtrate to further separate metal hydroxides as a filter cake from the filtrate.

There is also provided a method for collecting radioactive metals by way of dissolution, wherein organic matter contained in the filtrate which is separated by filtration after electrolysis is further decomposed by an ultraviolet irradiator.

There is also provided a method for collecting radioactive metals by way of dissolution, wherein the matter decomposed by ultraviolet irradiation is separated from the filtrate by reverse osmosis.

There is also provided a method for collecting radioactive metals by way of dissolution, wherein the matter decomposed by ultraviolet irradiation is separated from the filtrate by use of ion-exchange resin.

Further, there is also provided apparatus for decomposing an organic solution containing radioactive metals, which comprises: an electrical conduction tank in which an alkaline agent is fed to a solution composed of a chelating solution and/or an organic acid having dissolved therein radioactive metals laden with radioreactivity, to elevate electrical conductivity of the solution; and an electrolytic device located at a later stage than the electrical conduction tank to electrolyze the solution elevated in electrical conductivity.

There is also provided apparatus for collecting radioactive metals, which comprises: an electrical conduction tank in which an alkaline agent is fed to a solution composed of a chelating solution and/or an organic acid containing radioactive metals laden with radioactivity, to elevate electrical conductivity of the solution; an electrolytic device located at a later stage than the electrical conduction tank to electrolyze the metal solution elevated in electrical conductivity; and a filtration device positioned at a stage next to and communicating with the electrolytic device.

There is also provided apparatus for collecting radioactive metals, wherein the filtration device is provided between the electrical conduction tank and the electrolytic device.

There is also provided apparatus for collecting radioactive metals, wherein the filtration device is provided with an ultraviolet irradiation device having a separation device, at a later stage than the filtration device.

There is also provided apparatus for collecting radioactive metals, wherein the separation device is of a reverse osmosis type.

There is also provided apparatus for collecting radioactive metals, wherein the separation device is of an ion-exchange resin type.

BRIEF DESCRIPTION OF THE DRAWING

The drawing schematically illustrates a sketch of apparatus for decomposing an organic solution containing radioactive metal ions and apparatus for collecting radioactive metals using the same, which shows an embodiment of the present invention.

DETAILED DESCRIPTION OF THE PREFERRED EMBODIMENTS

Figure 1:
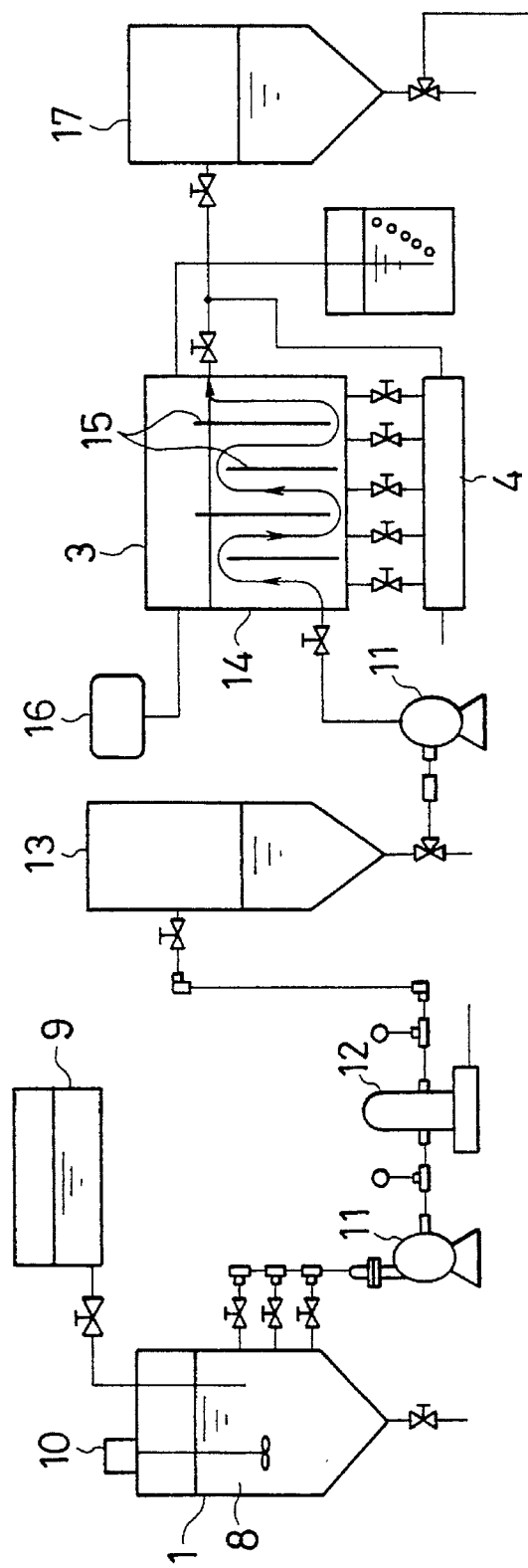
Figure 1:
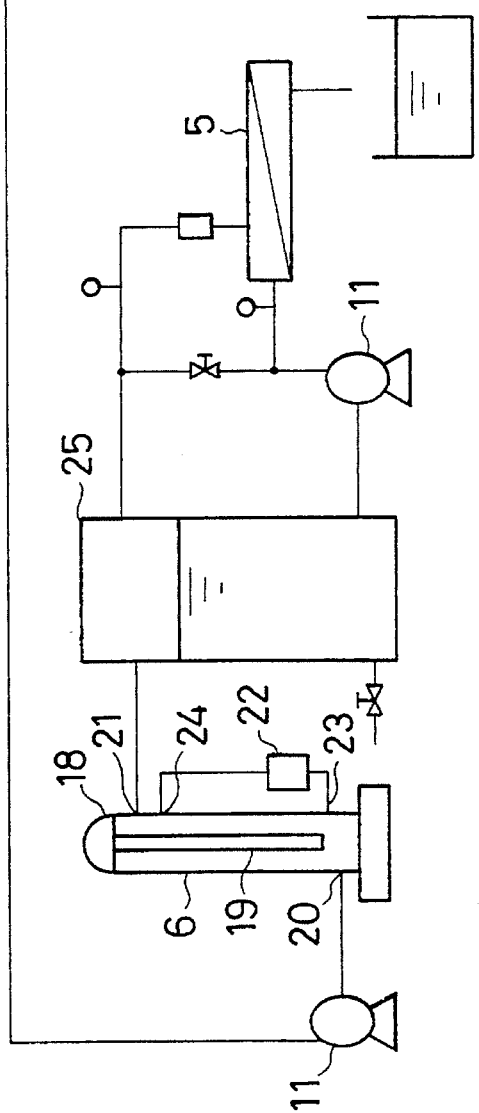

In the drawing, an electrical conduction tank 1 contains a solution composed of a chelating solution and/or an organic acid containing radioactive metal ions. Suitable chelating agents for preparation of a chelating solution include ethylenediamine tetraacetic acid, ethylenenitrilodiamine triacetic acid, hydroxyethylethylenediamine tetraacetic acid and the like. Suitable organic acids include citric acid, oxalic acid, acetic acid and the like. The chelating solution and organic acid may be used singly or in combination and contain radioactivity-laden metal ions such as Fe ions, Mn ions, Co ions and other metal ions.

Denoted by numeral 9 is an alkaline agent-feeding device from which a NaOH or KOH solution is supplied. An alkaline agent used here is a hydroxide of an alkali metal or of an alkaline earth metal. Numeral 10 is a stirrer, numeral 11 is a pump, and numeral 12 is a filtration device, which is, as an example, a cartridge filter in this embodiment. A filtrate tank is denoted by numeral 13. An electrolytic device 3 is composed of an electrolyzer 14 and a plurality of electrodes 15 designed to flow direct current. An air pump 16 of an electromagnetic type is provided to feed air which removes or blows off various gases. A tank 17 is provided to store a solution electrolyzed in the electrolyzation device 3.

A filtration device 4 communicates with the electrolyzer 14 and filters metal hydroxides which are little soluble in water coming out of the electrolyzer 14, to discharge the metal hydroxides as a filter cake and to convey the resultant filtrate to the tank 17.

An ultraviolet irradiation device 6 has an elongate tank 18 to which an ultraviolet lamp 19 is secured. The filtrate comes into the device 6 from an inlet 20 and comes out from an inlet 21. A pump 22 is arranged to feed air and provided with an air inlet 23 and an air outlet 24. The air thus fed generates ozone upon irradiation with ultraviolet rays, to promote oxidation of the filtrate. Numeral 25 is a tank. A separation device 5, which is as an example of a reverse osmosis type, is provided to separate organic matter and water resulting from decomposition in the ultraviolet irradiation device 6. The organic matter so decomposed is near mineral, and the water so separated may be recycled as clean water or discharged. The separation device 5 may also be of an ion-exchange resin type.

The operation of the apparatus which is constructed as described above will be described hereunder.

Firstly, an organic solution composed of a chelating solution and/or an organic acid is applied to radioactive metals laden with radioactivity, to form an organic metal solution. In this embodiment, a mixture of a chelating solution and an organic acid is used. For example, a mixture of ethylenediamine tetraacetic acid and citric acid, each being a 1% aqueous solution, is used. Contained in the metal solution are metal ions such as Fe ions, Mn ions and the like, and here explanation will be made as to Fe ions as an example.

The metal solution contained in the electrical conduction tank 1 is applied with a NaOH solution as an example from the alkaline agent-feeding device 9, and stirred by the stirrer 10. For example, the ratio of NaOH to a metal solution is 4 g/liter. Then iron hydroxides are formed in the metal solution and precipitated in colloid. The same kind of action occurs as to metals other than iron, too. Being a typical coprecipitant, iron helps precipitation of other radioactive metal ions. The metal solution is thereafter filtered in the filtration device 2 so that the iron hydroxides are separated and removed, while the resulting filtrate is fed into the electrolytic device 3 where the filtrate is electrolyzed. Efficient electrolyzation is made because the filtrate treated with an alkaline agent has markedly high electrical conductivity.

With respect to electrical conductivity of the metal solution treated with an alkaline agent, as an example, the following are the current densities as measured.

before addition of an alkaline agent: 0. 8 A/dm2 after addition of an alkaline agent: 10 A/dm2

Most of Fe ions are lost, and the chelating effect of the chelating solution is lost, presumably due to hydrolysis.

For instance, using disodium ethylenediamine tetraacetic acid, $C_{10}H_{14}N_2O_8Na_2 + 16H_2O \rightarrow 10CO_2 + 2NO + 2NaOH + 22H_2$. $CO_2$ and $NaOH$ are formed by anode oxidation and $H_2$ is formed at a cathode side. The organic acid is also decomposed by electrolysis to form $CO_2$, $H_2$ and the like.

Prior to electrolysis, most of the metal ions are removed in the treatment in the electrical conduction tank 1 and the filtration device 12 so that radioactive metals left to be deposited on the electrodes 15 of the electrolytic device 3 can be reduced greatly. Much deposition on the electrodes 15 is responsible for poor electrolysis efficiency. Moreover, radioactivity of the electrodes 15 is kept low because just a small extent of radioactive metal ions are still remaining. Thus troublesome post-treatment can be minimized. According to the invention, although a chelating solution and/or an organic acid containing radioactive ions are generally little conductive and difficult to be electrolyzed, they can be easily electrolyzed by increasing electrical conductivity by addition of an alkaline agent. This ensures easy collection of radioactive metal ions contained in such solutions.

In the above electrolytic treatment, in addition to the decomposition through the anode oxidation, a material convertible by electrolysis into highly oxidative matter, such as NaOH for example, may also be used to take advantage of its high oxidative action.

As a result of electrolysis, radioactive metal ions are converted into little-water-soluble hydroxides in the electrolyzer 14. The filtrate in the electrolyzer 14 is filtered in the filtration device 4 where the hydroxides are separated and removed. The separated filtrate is allowed to enter the ultraviolet irradiation device 6 from the lower inlet 20 and to be discharged out of the upper outlet 21 while being supplied with air bubbles. Oxygen in the bubbles generates ozone upon exposure to ultraviolet rays, and ozone acts to decompose any remaining organic matter, promoting decomposition of such organic matter by ultraviolet rays.

The organic matter decomposed by ultraviolet irradiation is near mineral and sent to the separation device 5 that is of a reverse osmosis type for example. In the device 5, the irradiated filtrate put inside a translucent membrane (not shown) is brought in pressurized condition so that water alone iscaused to pass through the membrane outside in clean water and thus separated from the decomposed organic matter. The separation device 5 may be an ion-exchange resin type. The solution containing the matter decomposed in the ultraviolet irradiation device 6 is sent to the ion-exchange resin device, where the decomposed matter is absorbed by the ion-exchange resin, while water free from the decomposed matter is separated as cleanwater. The water may be discharged or recycled to the first stage of the apparatus.

Being constructed as described above, the present invention enables the following available: It is available to electrolyze a solution composed of a chelating solution and/or an organic acid containing a radioactive metal ions, which is little soluble in water and difficult to be electrolyzed, by increasing electrical conductivity thereof by adding an alkaline agent, and to collect without difficulty radioactive metals contained in the solution. It is also available in collecting radioactive metals by way of dissolution to decrease mass volume of the radioactive matter required to be stored in safety quite significantly because there is no need to store radioactive chelating solutions and/or organic acids. Therefore, it is available to realize a quite high extent of reduction of storage space for radioactive matter. It is also available to make cementing treatment of the chelating solution and the organic solution after electrolysis because carboxyl groups therein have been decomposed. It is available to collect radioactive metal ions dissolved in the chelating solution and/or the organic acid, as hydroxides easily, because inherent activities of such solutions are lost by decomposition by electrolysis.

Prior to electrolysis, the radioactive metal ions in the chelating solution and/or the organic acid have already been considerably reduced, through convertion into little-water-soluble matter by addition of an alkaline agent and filtration thereafter. Therefore loading on the electrodes can be minimized, metals to deposit on the electrodes can be minimized, lowering of electrolytic efficiency can be prevented, and further, necessity to remove radioactive metals, which is dangerous to handle, from the electrodes can be minimized.

The alkaline agent which is added prior to electrolysis in order to decrease radioactive metal ions through conversion into matter poorly soluble in water and filtration thereafter serves to increase electrical conductivity of the electrolytic solution, and therefore realizes quite effective electrolysis. This may be well understood from the fact that electrical conductivity of the chelating solution and/or the organic acid is low before the treatment. Furthermore, it is available in the invention to collect most of radioactive metal ions through formation of matter poorly soluble in water by alkaline treatment combined with the electrolytic treatment. Further, it is available in the invention to collect almost all of radioactive metal ions by additional ultraviolet irradiation treatment and separation step. Furthermore, it is available in the invention to collect radioactive metal ions almost completely because an additional separation device is that by use of reverse osmosis or ion-exchange resin.

What is claimed is:

1. A method for decomposing an organic solution containing radioactive metal ions, which comprises:

forming a solution containing radioactive metal ions by applying a solution composed of a chelating solution and/or an organic acid to radioactive metals laden with radioactivity;

adding an alkaline agent to the formed solution to elevate electrical conductivity thereof; and electrolyzing the solution elevated in electrical conductivity by an electrolytic device.

2. A method for collecting radioactive metals by way of dissolution, which comprises:

forming a solution containing radioactive metal ions by applying a solution composed of a chelating solution and/or an organic acid to radioactive metals laden with radioactivity;

adding an alkaline agent to the formed solution to elevate electrical conductivity thereof;

electrolyzing the solution elevated in electrical conductivity by an electrolytic device to generate therein metal hydroxides which are little soluble in water; and filtering the resultant solution to separate metal hydroxides as a filter cake from the filtrate.

3. A method for collecting radioactive metals by way of dissolution, which comprises:

forming a solution containing radioactive metal ions by applying a solution composed of a chelating solution and/or an organic acid to radioactive metals laden with radioactivity;

adding an alkaline agent to the formed solution to elevate electrical conductivity thereof and to generate therein metal hydroxides which are little soluble in water;

filtering the resultant solution to separate the metal hydroxides as a filter cake from the filtrate;

electrolyzing the filtrate by an ectrolytic device to further generate therein metal hydroxides which are little soluble in water; and filtering the resultant filtrate to separate the additional metal hydroxides as a filter cake from the filtrate.

4. A method according to claim 3, wherein the filtrate separated by filtration after electrolysis is treated with an ultraviolet irradiation device to further decompose organic matter contained in the filtrate.

5. A method according to claim 4, wherein the matter decomposed by irradiation of ultraviolet rays is separated by reverse osmosis from the filtrate.

6. A method according to claim 4, wherein the matter decomposed by irradiation of ultraviolet rays is separated by use of ion-exchange resin from the filtrate.

7. An apparatus for decomposing an organic solution containing radioactive metals, which comprises:

an electrical conduction tank in which an alkaline agent is fed to a metal solution composed of a chelating solution and/or an organic acid having dissolved therein radioactive metals laden with radioactivity, to elevate electrical conductivity thereof; and an electrolytic device located at a later stage than the electrical conduction tank to electrolyze the metal solution elevated in electrical conductivity.

8. An apparatus for collecting radioactive metals, which comprises:

an electrical conduction tank in which an alkaline agent is fed to a metal solution composed of a chelating solution and/or an organic acid containing radioactive metals laden with radioactivity, to elevate electrical conductivity thereof;

an electrolytic device located at a later stage than the electrical conduction tank to electrolyze the metal solution elevated in electrical conductivity; and a filtration device positioned at a stage next to and communicating with the electrolyzation device.

9. Apparatus for collecting radioactive metals according to claim 8, wherein a filtration device is disposed between the electrical conduction tank and the electrolytic device.

10. Apparatus for collecting radioactive metals according to claim 8 or 9, wherein the filtration device is provided with an ultraviolet irradiation device having a separation device, at a later stage thereof for ultraviolet irradiation and separation treatment of the filtrate therefrom.

11. Apparatus for collecting radioactive metals according to claim 10, wherein the separation device is of a reverse osmosis type.

12. Apparatus according to claim 10, wherein the separation device is of an ion-exchange resin type.

* * * * *